(12) United States Patent
Clark

(10) Patent No.: US 8,572,849 B1
(45) Date of Patent: Nov. 5, 2013

(54) SYSTEM AND METHOD OF CONNECTING SURFACES IN AN IRREGULAR SPACE OR MEASURING AN IRREGULAR SPACE

(76) Inventor: Donald P. Clark, Tucson, AZ (US)

(*) Notice: Subject to any disclaimer, the term of this patent is extended or adjusted under 35 U.S.C. 154(b) by 0 days.

(21) Appl. No.: 13/237,777

(22) Filed: Sep. 20, 2011

(51) Int. Cl.
B21D 53/88 (2006.01)

(52) U.S. Cl.
USPC ............ 29/897.2; 29/897.312; 29/281.5; 403/53; 403/83

(58) Field of Classification Search
USPC ........... 29/897.2, 897.3, 897.31, 897.312, 29/525.01, 281.5; 403/1, 13, 14, 52, 53, 403/56, 57, 59, 60, 64, 81, 83, 84, 90, 91, 403/118, 119, 122, 131, 164, 165; 74/579 R, 74/586
See application file for complete search history.

(56) References Cited

U.S. PATENT DOCUMENTS

| | | | | |
|---|---|---|---|---|
| 1,347,808 A * | 7/1920 | Franklin | | 403/119 |
| 1,500,921 A * | 7/1924 | Bramson et al. | | 285/146.2 |
| 1,528,967 A * | 3/1925 | Bersted | | 184/105.3 |
| 1,579,160 A * | 3/1926 | Spikings | | 403/64 |
| 2,095,416 A * | 10/1937 | Lefevre | | 74/579 R |
| 2,859,060 A * | 11/1958 | Davies et al. | | 403/122 |
| 3,124,971 A * | 3/1964 | Peters et al. | | 74/579 R |
| 3,539,234 A * | 11/1970 | Rapata | | 384/203 |
| 3,757,476 A * | 9/1973 | Schoen | | 52/646 |
| 4,438,612 A * | 3/1984 | Bernard et al. | | 52/427 |
| 4,480,418 A * | 11/1984 | Ventrella | | 52/655.2 |
| RE31,809 E * | 1/1985 | Danieletto et al. | | 606/57 |
| 4,704,043 A * | 11/1987 | Hackman et al. | | 403/56 |
| 4,898,490 A * | 2/1990 | Herbermann et al. | | 403/56 |
| 5,238,015 A * | 8/1993 | Gretzmacher et al. | | 135/125 |
| 5,461,515 A * | 10/1995 | Sorce | | 359/872 |
| 5,495,677 A | 3/1996 | Tachikake et al. | | 33/784 |
| 5,642,956 A * | 7/1997 | Hale | | 403/122 |
| 6,382,865 B1* | 5/2002 | Paxman | | 403/131 |
| 6,540,188 B2* | 4/2003 | Jenkins et al. | | 248/276.1 |
| 6,648,583 B1* | 11/2003 | Roy et al. | | 414/735 |
| 7,025,315 B2* | 4/2006 | Carnevali | | 248/276.1 |
| 7,993,069 B2* | 8/2011 | Persson | | 403/56 |
| 8,196,883 B2* | 6/2012 | Hirschhorn | | 248/276.1 |
| 2002/0056339 A1* | 5/2002 | Takahashi | | 74/579 R |
| 2003/0077110 A1* | 4/2003 | Knowles | | 403/56 |
| 2003/0138289 A1* | 7/2003 | Ronsheim | | 403/90 |
| 2003/0165353 A1* | 9/2003 | Clausell | | 403/56 |
| 2003/0180088 A1* | 9/2003 | Carnevali | | 403/56 |
| 2004/0122628 A1 | 6/2004 | Laurie | | 703/1 |
| 2005/0095058 A1* | 5/2005 | Biba et al. | | 403/56 |
| 2008/0202274 A1* | 8/2008 | Stuart | | 74/490.02 |
| 2009/0229895 A1 | 9/2009 | Gibbs | | 180/11 |
| 2011/0188925 A1* | 8/2011 | Komine et al. | | 403/83 |
| 2011/0222960 A1* | 9/2011 | Kiefer | | 403/122 |
| 2011/0278417 A1* | 11/2011 | Diamond | | 248/349.1 |
| 2012/0027505 A1* | 2/2012 | Lin | | 403/83 |
| 2012/0070223 A1* | 3/2012 | Wimberley | | 403/90 |

* cited by examiner

Primary Examiner — David Bryant
Assistant Examiner — Christopher Koehler
(74) Attorney, Agent, or Firm — Hayes Soloway P.C.

(57) ABSTRACT

A connector and method of connecting two surfaces in an irregular, interrupted, or non-uniform space is provided. The connector is composed of at least one link, wherein each link has an adjustable spatial feature such as the length, thickness, or angle of the link. The spatial features of the links are adjusted to custom fit the connector to the two surfaces and the available space therebetween. Once the links have been adjusted to provide a satisfactory custom fit, the adjustable spatial features of the links may be fixed to form a substantially permanent solid structure or may be recorded to allow production of a custom shaped connector with substantially the same spatial features as the custom fit connector.

30 Claims, 19 Drawing Sheets

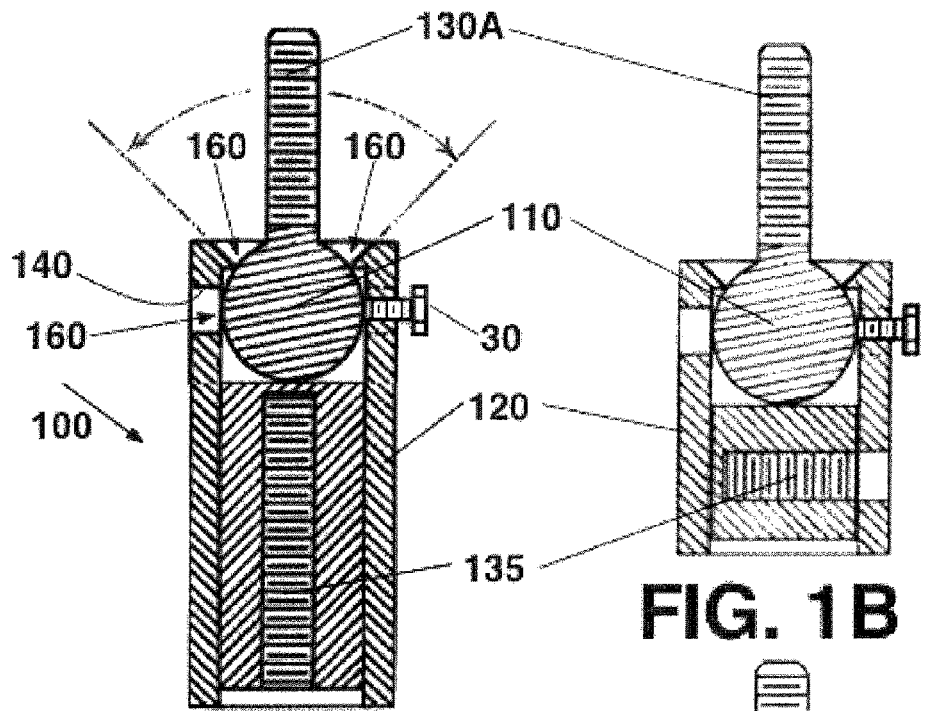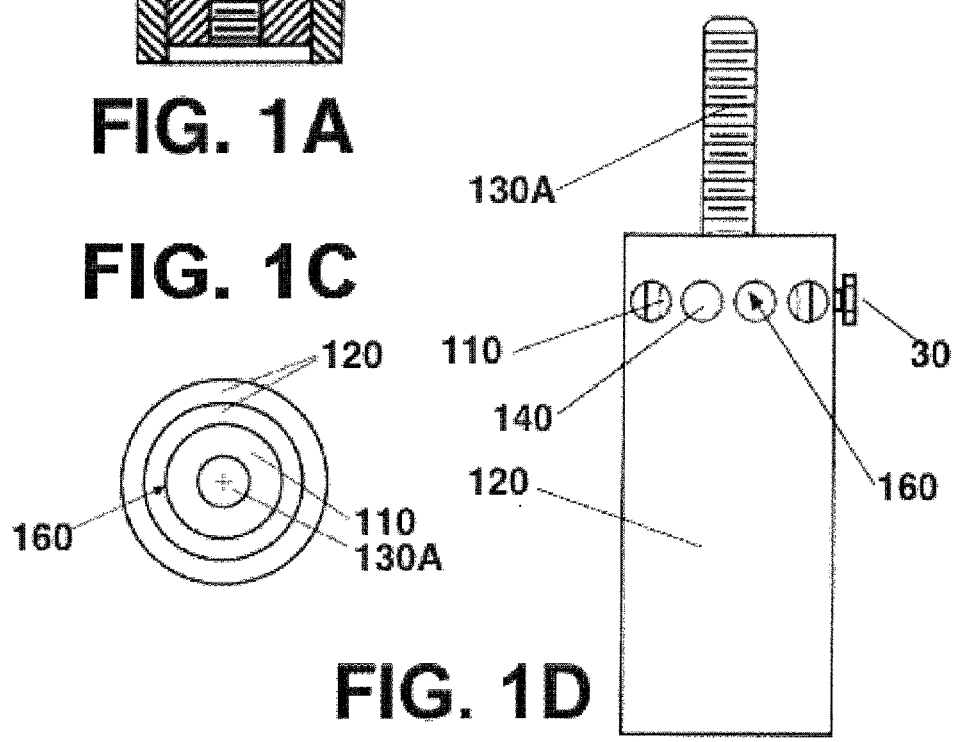

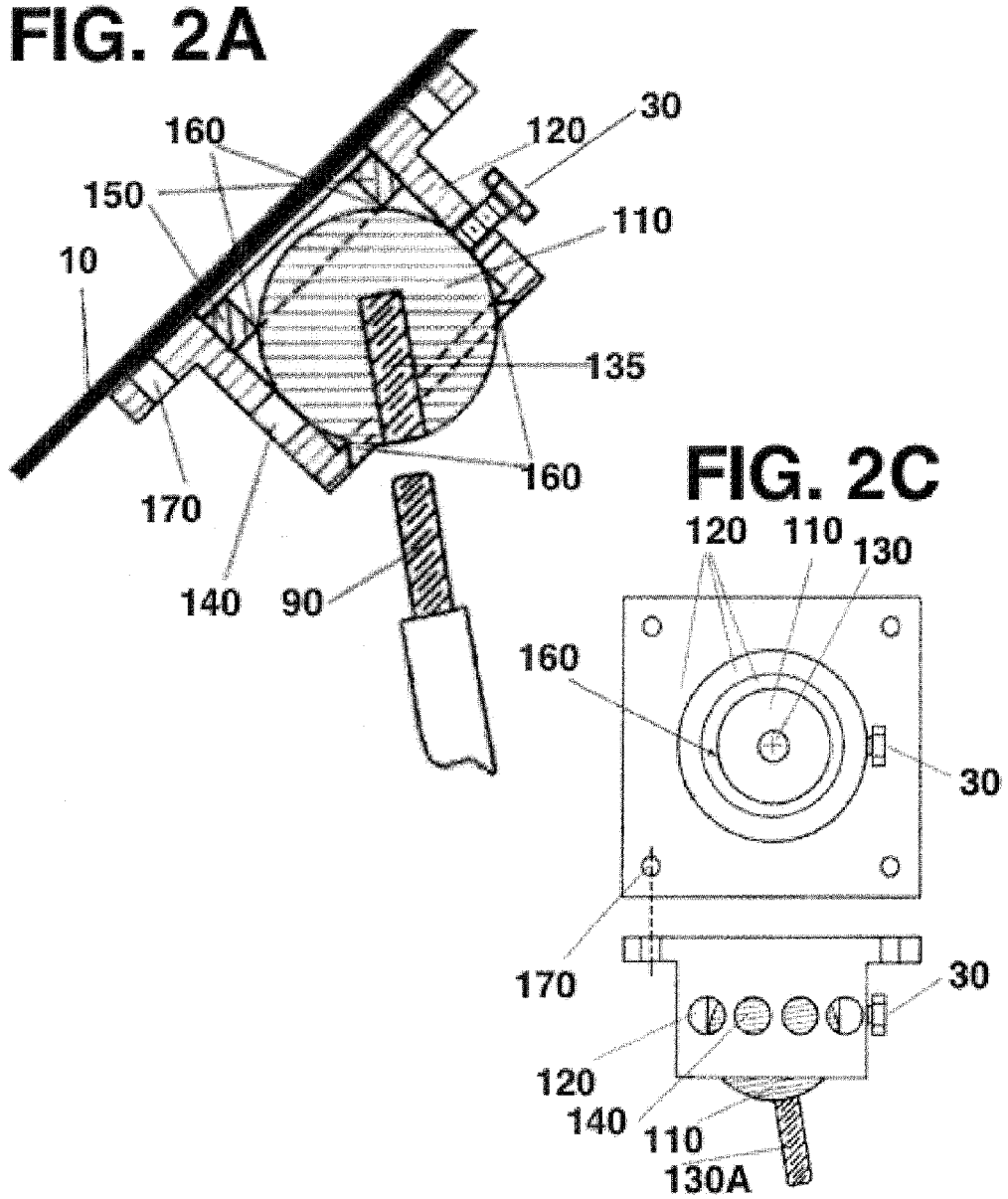

FIG. 5
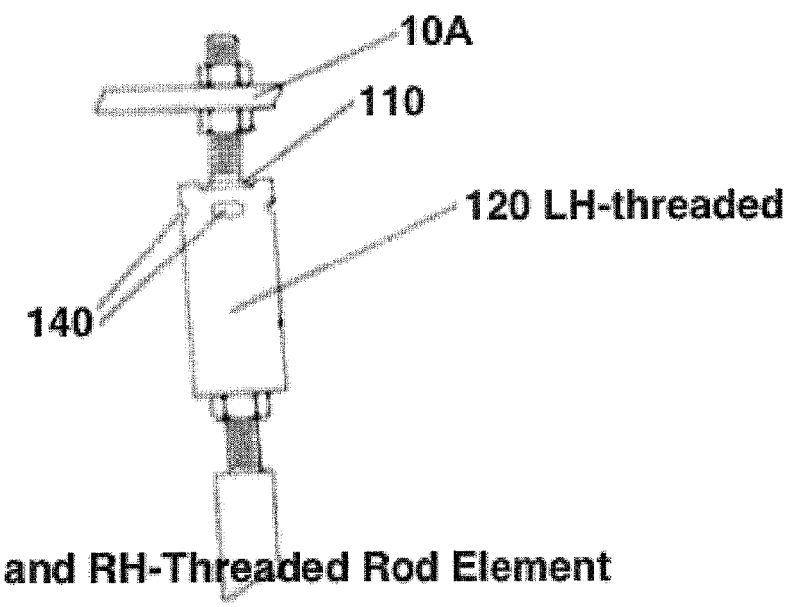
LH- and RH-Threaded Rod Element
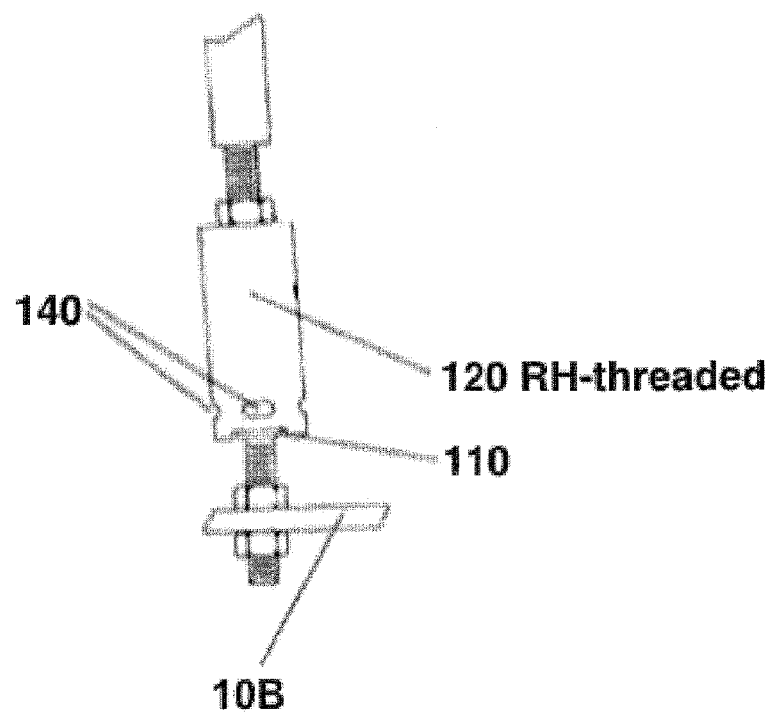

35

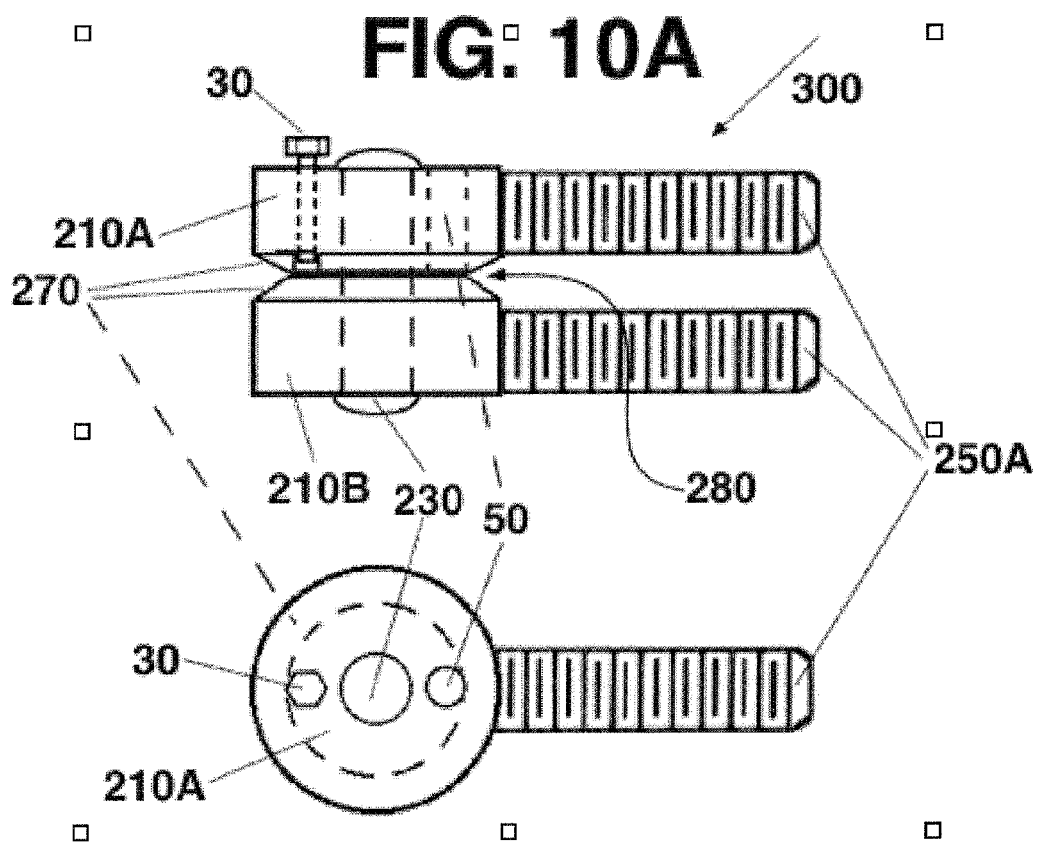

FIG. 11A
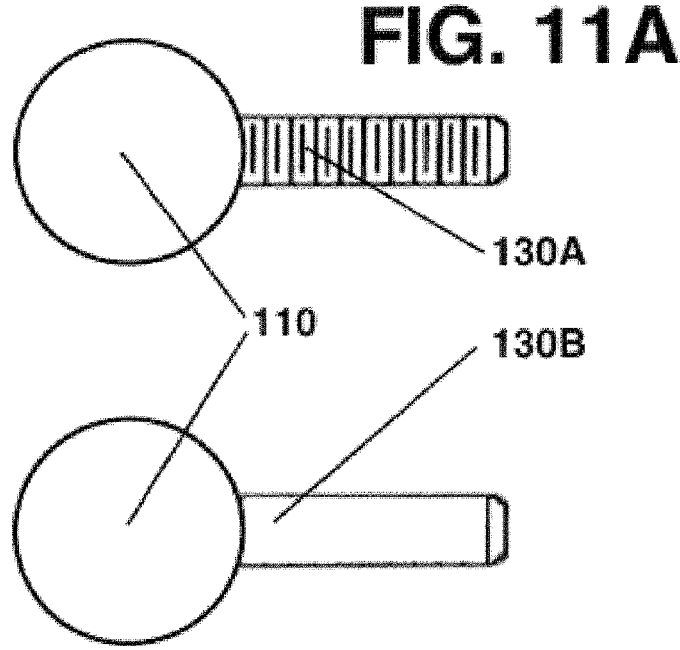
FIG. 11B
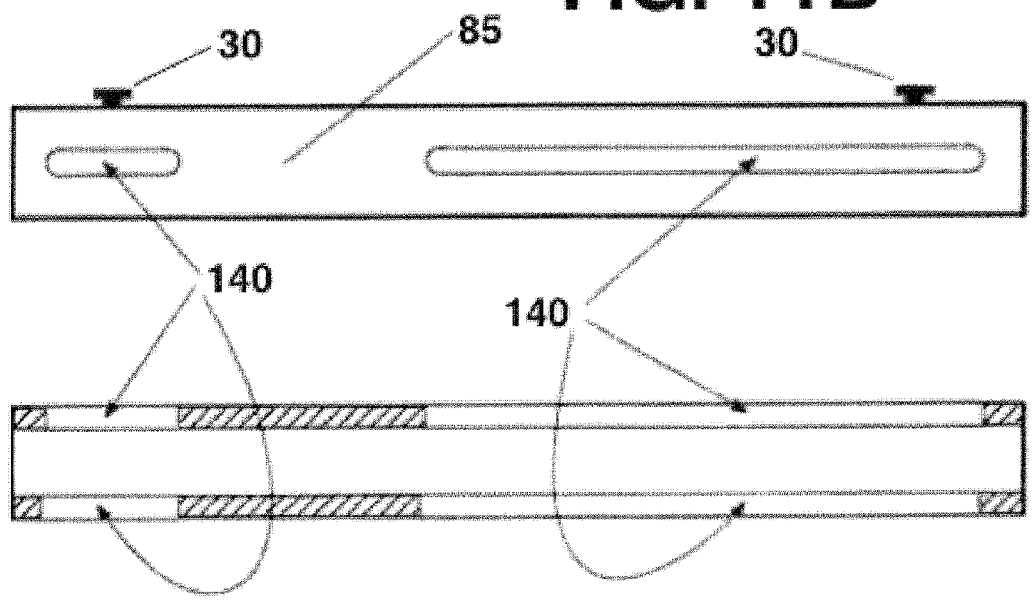
FIG. 11C

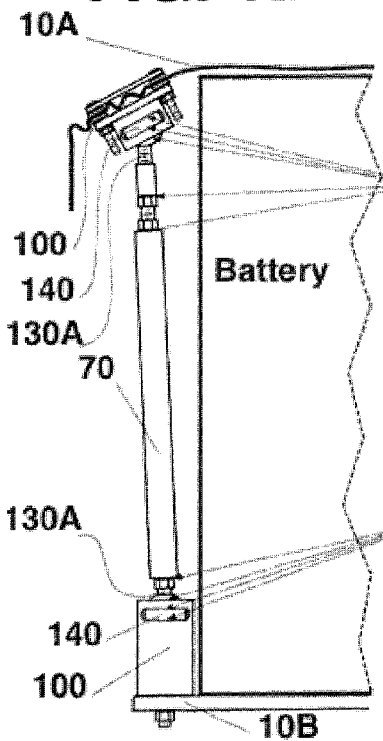
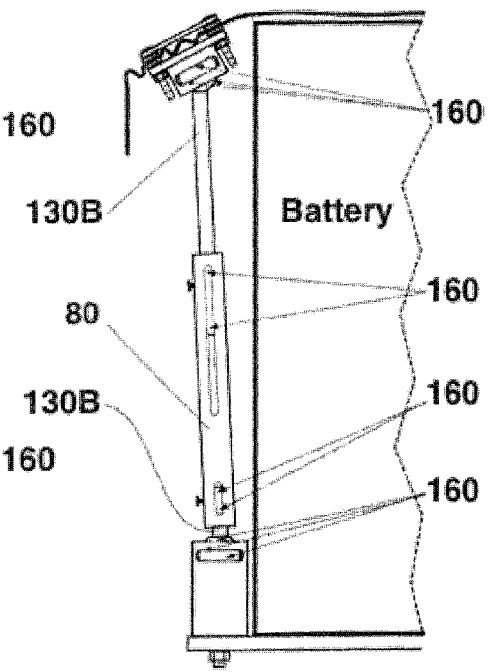
FIG. 12A
FIG. 12B

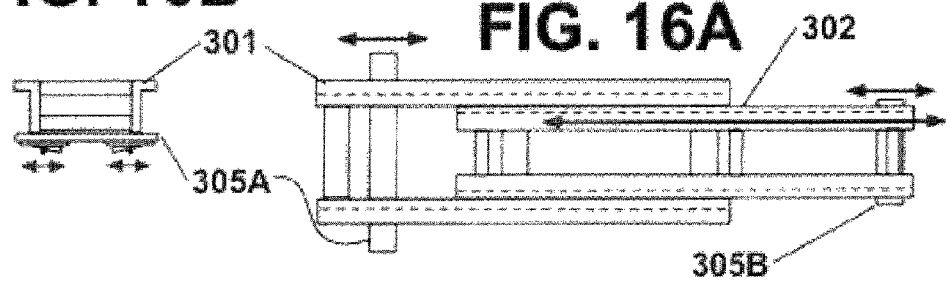
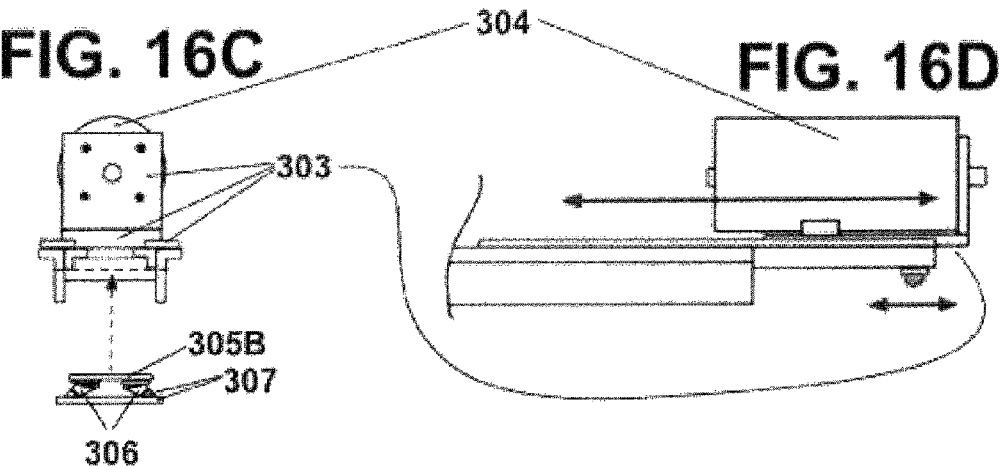
FIG. 16B
FIG. 16A
FIG. 16C
FIG. 16D

SYSTEM AND METHOD OF CONNECTING SURFACES IN AN IRREGULAR SPACE OR MEASURING AN IRREGULAR SPACE

CROSS REFERENCE TO RELATED APPLICATION

This application claims priority from U.S. Provisional Application Ser. No. 61/404,876, filed Oct. 12, 2010, the contents of which are incorporated hereby reference.

BACKGROUND

1. Field

The present disclosure is directed to a structural link or measuring device between two randomly positioned surfaces. The link is especially useful in securing new components into pre-existing spaces having widely varying shapes and contours, such as securing battery packs in electric vehicles, and will be described in connection with such utility. The connector may also be used as a measuring device for fabricating more customized connecting hardware.

2. Description of Related Art

As people have become more aware of the scarcity of limited natural resources, significant resources have been directed at reusing or recycling existing materials and infrastructure. This trend is most clearly evidenced in the automobile industry, as federal and state mandates have required cars and trucks to become more efficient. In theory, electric cars have strong advantages over gasoline cars. Pure electric cars have no emissions, and the electricity they use can come from a variety of sources. They have few moving parts and require little maintenance. For the same reason, they do not break down often and are more reliable than gasoline cars. Most of all, they are much more energy efficient than gasoline cars.

Notwithstanding the differences in efficiency, gasoline cars continue to dominate the passenger car and light truck market, and virtually every vehicle on the road today is powered by a gasoline or diesel engine. To improve consumption, and reduce emissions, car makers have, among other things, modified gasoline engines to burn cleaner, unleaded gasoline; installed catalytic converters and developed sophisticated exhaust control systems. Famously, some manufacturers are beginning to offer new vehicles with an electric motor or combination of electric and backup gasoline motors. These new electric vehicles are heavily subsidized, and remain quite costly for most consumers. Few dispute that an electric car, if economically viable and widely accepted, would greatly reduce air pollution in major cities, decrease carbon emissions, and lessen reliance on oil imported from unstable areas.

Many parts of a gasoline car and an electric car are essentially identical. Electric motors and drive trains have been engineered and created having a wide variety of shapes, sizes, and capabilities, but are rarely used to replace existing gasoline or diesel motors in existing vehicles or existing car designs. Part of the problem in converting a gasoline driven vehicle into an electrically driven vehicle is coupling the new motor to the drive train of the existing gasoline driven vehicle. Substantial modification may need to be made to secure the new motor in the old vehicle. Some attempts at converting gasoline vehicles to electric vehicles, such as that shown in US 2009/0229895, even use a "push" trailer that may be coupled to the gasoline vehicle frame to provide the electrically driven motive force to the vehicle. Moreover, battery and electric technology is changing much faster than traditional mechanical technology. As the size and shape of components for electric vehicles rapidly change, a need exists to securely install a new component in a space designed for accommodating an older version of a component.

Current methods of securing a conversion component into a variably shaped space are extremely cumbersome. The ideal location for the replacement component must be determined and distances from component surfaces to the surface of the compartment in which the component is to be installed must be painstakingly calculated. Usually, direct connections from a stable surface to the component are unavailable and mounting hardware must be custom designed with one, and possibly multiple, angled portions in order to secure the replacement component into the space available. Expensive three dimensional modeling software may be employed, but still may not exactly resemble the actual physical articles involved, leading to complications in installing hardware in the physical world.

One of the most difficult problems in installing electric-drive components into a car that has had all of its gas-burning components removed will be in converting a car's body space that had formerly contained a gas tank to now house and secure a battery pack. The body sheet metal creating newly available space will likely be extremely irregular, not having been created to accommodate anything other than the former gas tank. A need accordingly exists for a more efficient method and apparatus of securing a conversion or replacement component having some shape into an existing space that has an irregular shape. A need further exists for a more efficient system and method for measuring or modeling an effective support hardware structure in situ for securing a component in an irregular space.

BRIEF SUMMARY

The present disclosure provides among other things a connector to join two surfaces in an irregular, interrupted, or non-uniform space. In one embodiment, the connector is composed of a series of links, or couplers (as used herein the terms "link" or "links" and "coupler" or "couplers" are used interchangeably) wherein each link has an adjustable spatial feature such as the length, thickness, or angle of the link. The spatial features of the links are adjusted to custom fit the connector to the two surfaces and the available space therebetween. Once the links have been adjusted to provide a satisfactory custom fit, the adjustable spatial features of the links may be fixed to form a permanent solid structure or may be recorded to allow production of a custom shaped connector with substantially the same spatial features.

In one aspect of the disclosure, a system for connecting surfaces in an irregular space is provided. The system includes a link having at least one adjustable spatial coupling feature and one fixed connecting feature. The spatial feature of the link is adjusted by varying the spatial features of at least one element in the link. Each link has a housing and a coupling component to join with another link or other piece of hardware. In a particular embodiment, the couplings of the links include threaded projections-or sockets, and base plates for mounting to a desired surface. The adjustable spatial features of the links are adapted to be fixed in a permanent way as a non-adjustable solid structure after the connection has been formed between the two pieces of hardware or surfaces. For example, the housing may have at least one aperture adapted to allow access to the rotational coupler, such that the user may conveniently fuse the adjustable links into a solid structure by welding. In such case, the melting points of the components of a link may be of compatibly weldable materials. Alternatively, the components of the link may be adhesively fixed in position.

The length and angle of a link may be varied by a ball shaped body that may be rotated in the housing to provide movement in one or two planes. The ball shaped body may have a threaded projection, a threaded socket, or a combination of projections and sockets. The angle of the link may be varied by rotating the ball, and the length of the link may be varied by rotation of the threaded portions to vary the distance a projection is inserted into a socket. In a particular embodiment, the housing has the basic shape of a cylinder with a first ball shaped body on one end and a socket or projection on the other end. Alternatively, the housing may contain a second ball shaped body on the end opposite to the first ball shaped body. The first ball shaped body may have a projection, a socket, or some combination of projections and sockets. The housing of the link may contain a threaded socket in addition to and separate from the ball shaped body that is either parallel to the axis of the housing or perpendicular to the axis of the housing to create an approximation of a T or L shaped. A pair of links may be coupled to the oppositely-threaded ends of a rod element to form a turnbuckle strut or tie assemblage.

In another embodiment of the disclosure, the link comprises a disc shaped body that may be rotated relative to the housing rather than a ball shaped body. The disc contacts a planar portion of the housing and may have a projection or a socket. The disc shaped body may include a plurality of equally spaced nubs corresponding to an equal number of equally spaced recesses in the housing of the link. When the nubs and recesses align, the rotation of the disc shaped body relative to the housing is at least partially constrained.

In yet another aspect of the disclosure, a method of modeling a connector to connect two surfaces in an irregular space includes providing a connector having at least one adjustable spatial feature, and a gauge that measures the adjustable spatial feature or features. When the connector is adjusted to custom fit the two surfaces to be connected, the measurements of the adjustable features are recorded in a memory internal to the connector or transmitted by wire or wireless communication to a memory external to the connector. The measurements may be used to create a three dimensional model of a solid structure that would connect the two surfaces in a way similar to the custom fit of the adjusted connector.

The advantage of the present invention is the versatility of the structural connectors to self-adapt to a wide variety of required in situ positionings, so facilitating the conversion of gas vehicles into electric vehicles by making practical the in situ replacement of a car's gas tank with a battery.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. If the provisions of 35 U.S.C. §112, ¶6 are sought to be invoked to define the inventions, the claims will specifically and expressly state the exact phrases "means for" or "step for, and will also recite the word "function" (i.e., will state "means for performing the stated function", without also reciting in such phrases any structure, material or act in support of the function. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 1A depicts a section view of a link using a ball shaped body.

FIG. 1B depicts a section view of an alternative embodiment of a link using a ball shaped body.

FIG. 1C depicts a plan view of a link using a ball shaped body.

FIG. 1D depicts an elevation view of an alternative embodiment of a link using a ball shaped body.

FIG. 2A depicts a section view of an alternative embodiment of a link using a ball shaped body.

FIG. 2B depicts an elevation view of an alternative embodiment of a link using a ball shaped body of FIG. 2A.

FIG. 2C depicts a plan view of the link using a ball shaped body of FIG. 2A.

FIG. 5 depicts two of two ball shaped body links as features of a turnbuckle strut or tie creating a welded-solid connection between two surfaces with non-aligned attachment points.

FIG. 10A depicts an elevation view of a double-rotating bolts link showing beveled edges creating open welding areas.

FIG. 10B depicts a plan view of the double-rotating bolts link showing beveled edges creating open welding areas.

FIG. 11A presents ball shaped bodies featuring both a threaded ball-coupler and a rod ball-coupler.

FIG. 11B is an elevation view of a sleeve coupler.

FIG. 11C is a 90 degree section view of FIG. 11B.

FIG. 12A illustrates a threaded turnbuckle link tie assembly of the present invention hanging a battery in the former fuel tank body area of a vehicle being converted into an electric vehicle (EV).

FIG. 12B illustrates a rod and sleeve link tie assembly of the present invention hanging a battery in the former fuel tank body area of a vehicle being converted into an electric vehicle (EV).

FIGS. 16A-D schematically illustrate the installation of an electric motor into a formerly internal combustion engine driven rear wheel drive vehicle.

Figure 3:
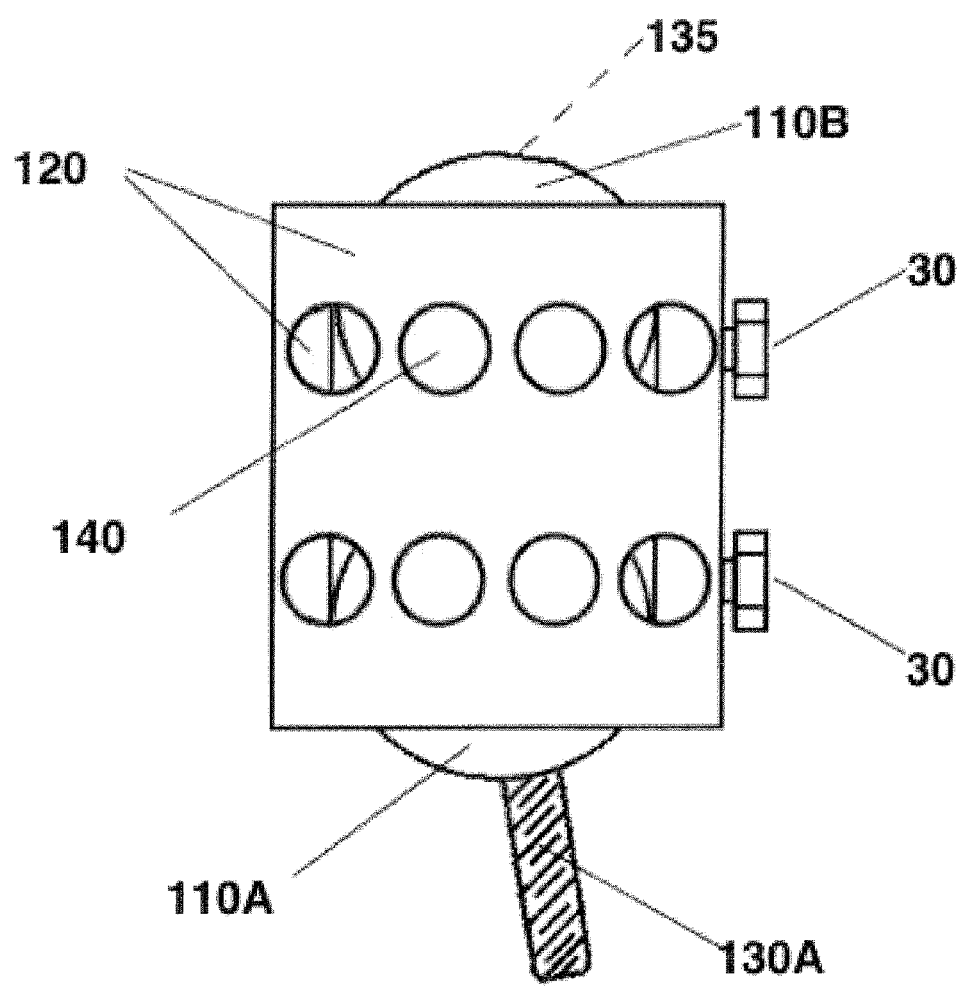
FIG. 3 depicts an elevation view of an alternative embodiment of a link using two ball shaped bodies.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, and it should be noted that there are many different and alternative configurations, devices and technologies to which the disclosed inventions may be applied. The full scope of the inventions is not limited to the examples that are described below.

In one application of the link of the invention, an adjustable coupler is provided that is initially adaptive in the coupler's length, circumference, thickness, angle, or other spacial feature to allow the user to determine a preferred positioning and/or dimension of the adjustable coupler. The link may then be secured by, for example, welding, into a solid load-bearing structural-element. The link thereby becomes a rigid support between the two surfaces it connects. In an alternative embodiment of the invention, the variable spacial feature of the connector is monitored by gauging circuitry internal to the connector and transmitted to a display or recorded in a memory. The spacial feature may then be reproduced by custom manufacturing machinery or by a skilled craftsman in a custom piece of hardware that may be used as a load-bearing structural element.

As will be described below, in a particular embodiment, the link may be comprised in some combination of as a weldable-ball link, a rotatable disc link or rotating bolts link. The links may also enable an adjustable threaded turnbuckle or a rotably- or slidably-self-aligning rod and sleeve link assembly. The weldable-ball link 100 is a configuration of a housing at least partially containing a ball shaped body 110. In FIGS. 1A-D a projection 130A extends from the ball shaped body 110 and may be threaded as shown. Alternatively, as shown in FIG. 2A, the ball shaped body 110 may have a socket 135 adapted to couple to an attaching element 60. While the drawings show threaded projections 130 and matching sockets 135, other structures may be used to mechanically couple one link to another within the scope of the disclosure.

The housing 120 partially secures the ball shaped body 110 while allowing movement of projection 130A, or socket 135, in at least one degree of freedom. That is, the projection 130A may move at least in a single plane. The projection 130A may also move in a second plane as well, thereby having two degrees of freedom of movement.

Movement of the ball shaped body 110 allows rotational alignment between one or more links to create an appropriate in situ positioning of the link. The ball shaped body 110 may be fitted in the housing 120 such that some resistance is provided to rotating the ball shaped body 110. The link will thus substantially remain in a given position until it is intentionally moved to a different position.

The housing 120 has at least one aperture 140 through which the contained ball shaped body 110 may be accessed. The aperture may have a variety of shapes and sizes to allow varied access to the ball shaped body 110. If and when desired, the aperture 140 allows the user to firmly or permanently secure the link in a given position by welding the ball shaped body 110 into one solid structure with the housing 120. In this embodiment, since the end state of the link is to become a solid structure, no great precision is required in the manufacture of the link. As shown in FIG. 1D a plurality of apertures 140 may allow more complete access to the ball shaped body 110 for ease of welding by a user. Housing 120 may include open welding areas 160 that can be filled with a welding material, fusing the link to into a single solid structural element.

All components of a link may be made from compatibly weldable materials allowing appropriate components to be structurally welded solidly together. In FIG. 2A, once the desired position of the ball shaped body 110 is determined it can be structurally fused to ball retainer 150, and ball retainer 150 to housing 120.

If desired, the position of the ball shaped body 110 within the housing 120 may be at least temporarily secured by, for example, a set bolt 30 or other agent that exerts a compressing or clamping force on the ball shaped body. This feature of the disclosure is particularly useful if it is necessary to remove the link to a different location to be permanently fixed in position by welding or other appropriate method.

The ball shaped body 110 may also contain a socket 135. The socket 135 may attach to an attaching element 60 from any other link or body. Alternatively, the housing 120 is configured to mount to a surface 10 on the end of the link opposite to the ball shaped body 110 as shown in FIG. 2A-C. To this end, the housing 120 may include mounting holes 170 in a desired position to conveniently couple the housing 120 to a surface 10.

As shown in FIG. 2A, housing 120 may contain a ball retainer 150. Ball retainer 150 exerts some pressure on the ball shaped body 110, providing some resistance to movement of the ball shaped body 110.

As yet another alternative, the housing may contain multiple ball shaped bodies 110 as shown in FIG. 3. A first ball shaped body 110A may have a threaded projection 130A and the second ball shaped body 110B opposite, to the first ball shaped body 110A, may have a threaded socket 135. One having skill in the art will recognize that a number of alterations may be made to the specifically described embodiment and still be within the scope of the disclosure. For example, both the first and second ball shaped bodies may have projections 130, sockets 130A, or a combination of coupling elements. Also, as will be discussed below, the link may comprise slidably-adjustable elements. Similarly, a third ball shaped body may be provided in the housing to create a T-type junction with each portion of the link adjustably coupling to another link or other mechanical structure.

Figure 4:
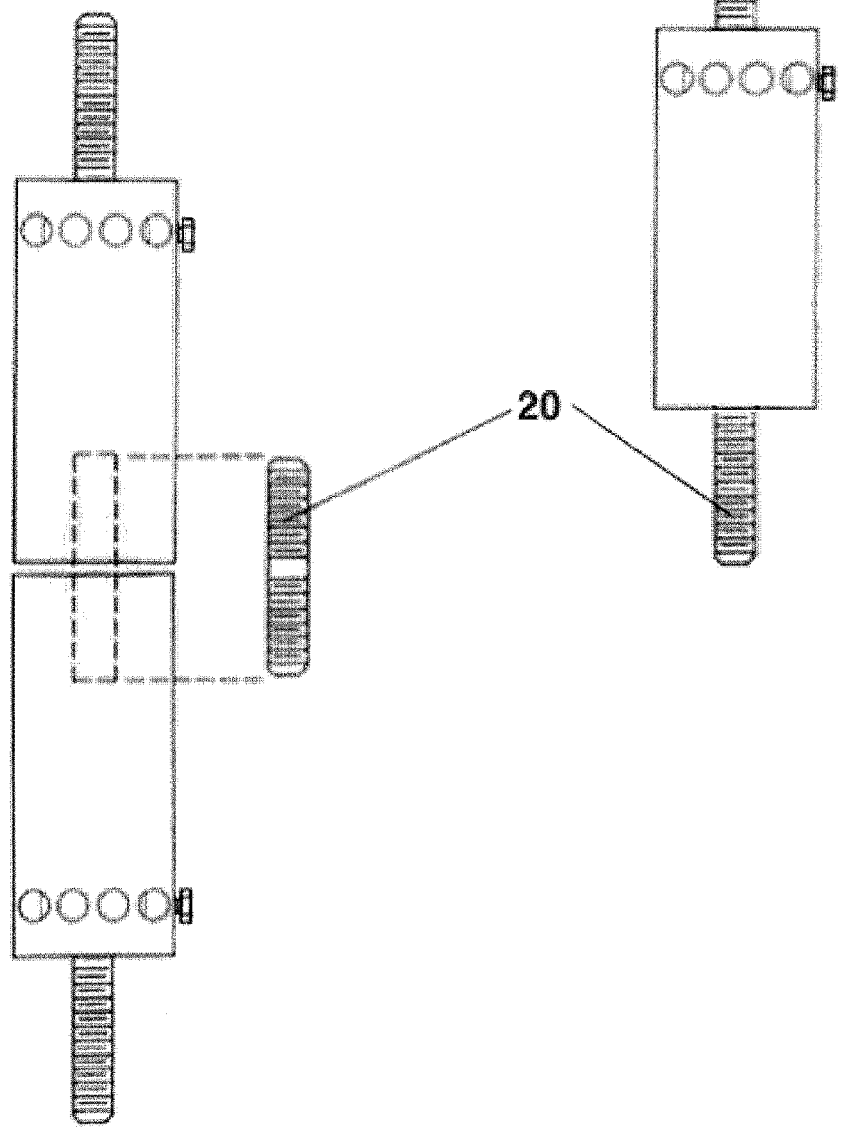
FIG. 4A depicts an elevation view of two links of FIG. 1A attached together by a double-end bolt.
FIG. 4B depicts a ball shaped body link of FIG. 1A with a housing having a double-end bolt attached.

FIG. 4A illustrates two weldable-ball links attached together by a double-end bolt 20 to form an assemblage with a similar functionality as FIG. 3.

FIG. 4B illustrates a weldable-ball link fitted with a double-end bolt 20 as the housing's rigid connection element.

FIG. 5 illustrates a pair of weldable-ball links with oppositely RH- and LH-threaded connecting-element housings that may attach to RH- and LH-threaded ends of a rod element to form a turnbuckle weldable-ball link strut or tie assemblage. This structure may be used to create a welded-solid structural connection between two surfaces 10A, 10B with non-aligned attachment points. Oppositely-threaded links attaching to oppositely-threaded ends of a strut or tie rod creates an adjustable-in-length turnbuckle structure. The length of the structure may be secured with nuts as shown, or may be accomplished by a threaded mechanism interior to the link itself, and by welding. The housing 120 of each link may support its enclosed ball shaped body 110 to take both compressive and tensioning loads, allowing either hanging or supportive connecting structures.

Figure 6A:
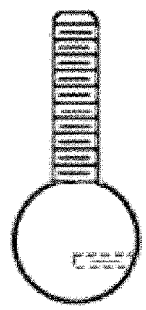
FIG. 6A depicts a ball shaped body having a receiving interface for a torquing tool.
Figure 6B:
FIG. 6B depicts a ball shaped body with multiple receiving interfaces for a torquing tool.
Figure 6C:
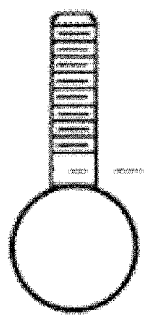
FIG. 6C depicts a ball shaped body with a receiving interface for a torquing wrench.

FIG. 6A illustrates a ball shaped body having a receiving interface for a torquing tool;

FIG. 6B illustrates a ball shaped body having a receiving interface for a torquing tool; Similarly, FIG. 6C illustrates a ball shaped body with a receiving interface for a torquing wrench.

Figure 6D:
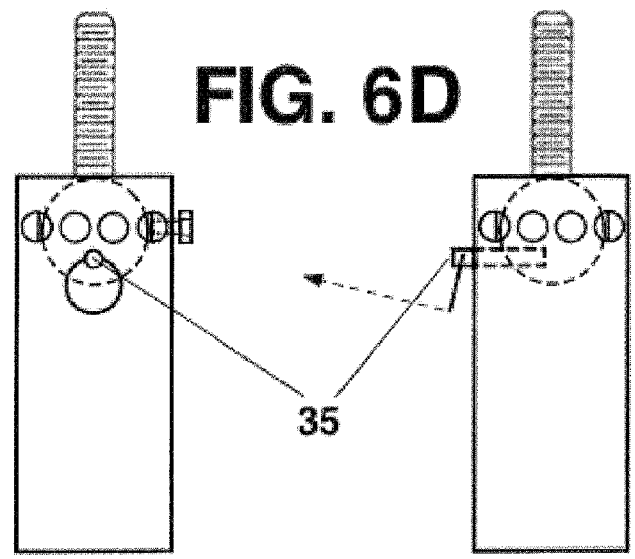
FIG. 6D depicts a link with a removable pin locking a ball shaped body in position within its housing.

FIG. 6D illustrates a locking pull-pin 35 that initially secures the ball shaped body on axis with its housing. The rotation of the ball shaped body thus prevented, the link has the functionality of being able to be twisted into a socket as one unit. When pull-pin 35 is pulled, the ball shaped object is then free to swivel in its housing.

The adjustable links of the disclosure provides an infinite variety of shapes in the resulting permanent connectors.

Figure 7A:
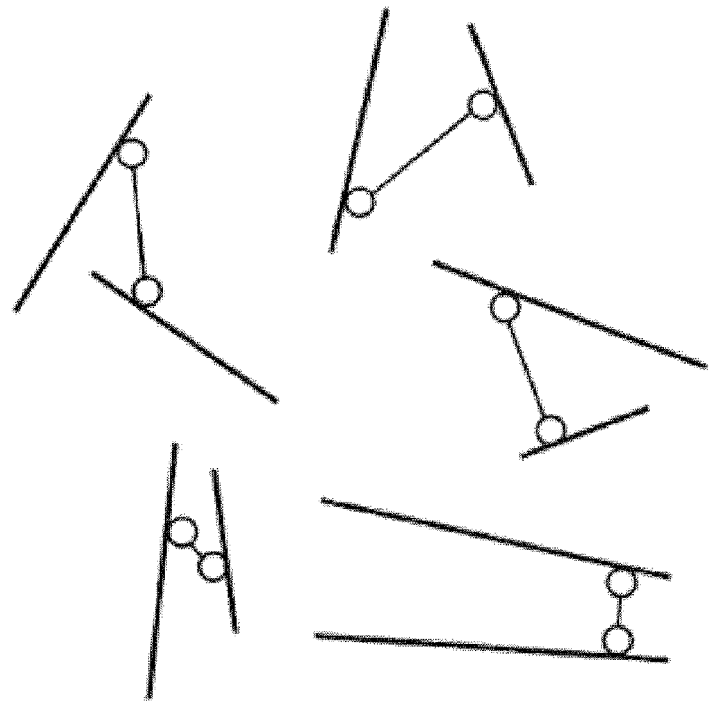
FIG. 7A depicts chaotic positions of paired surfaces connected by the links of the disclosure.

FIG. 7 illustrates a number of angled connectors that may be formed in situ using the weldable link of the disclosure. As can be seen by the illustrated embodiments, the connectors may vary in length, and angular connections to provide a solid structural interface between surfaces in wildly varying environments.

Figure 7B:
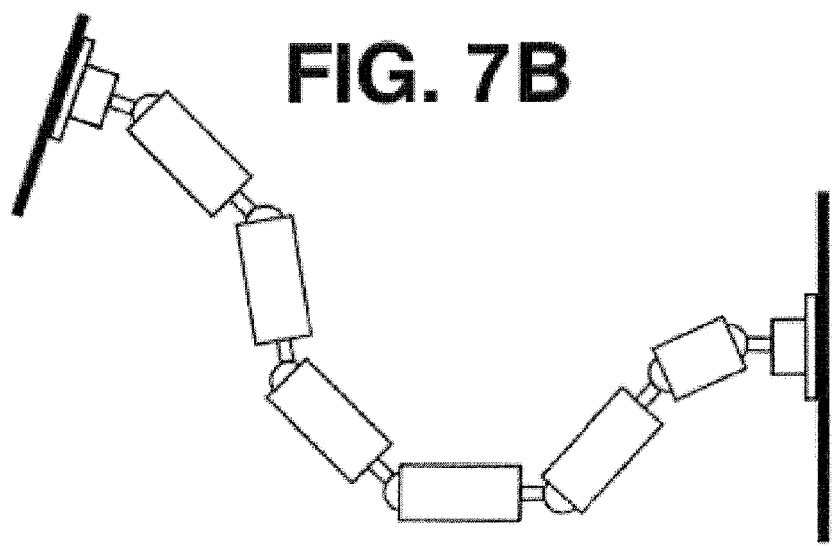
FIG. 7B depicts two non-aligned surfaces connected by a series of coupled links.

FIG. 7B Illustrates a connection between surfaces solely as a series of links.

Figure 8A:
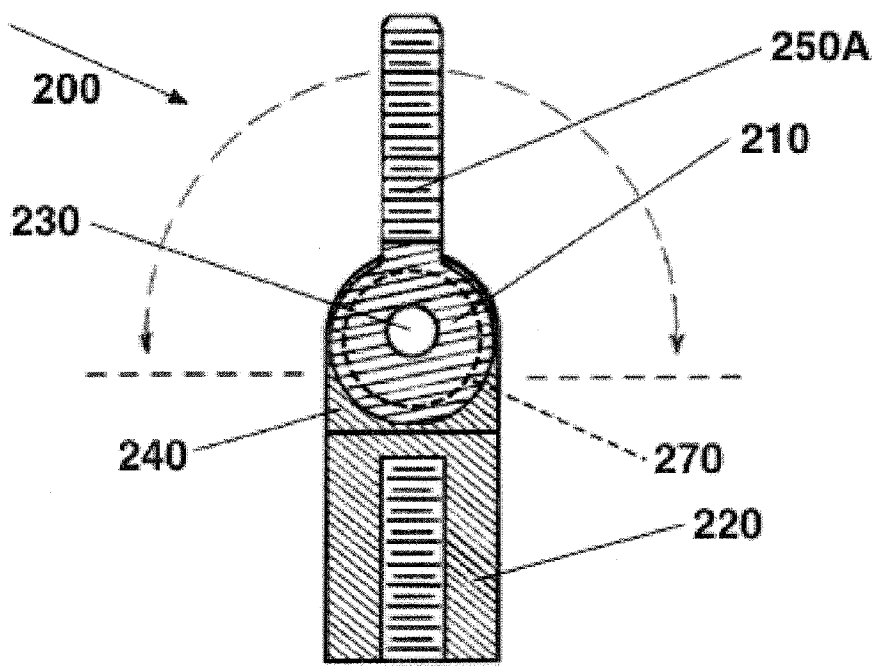
FIG. 8A depicts a section view of a link using a disc shaped body.
Figures 8B, 8C:
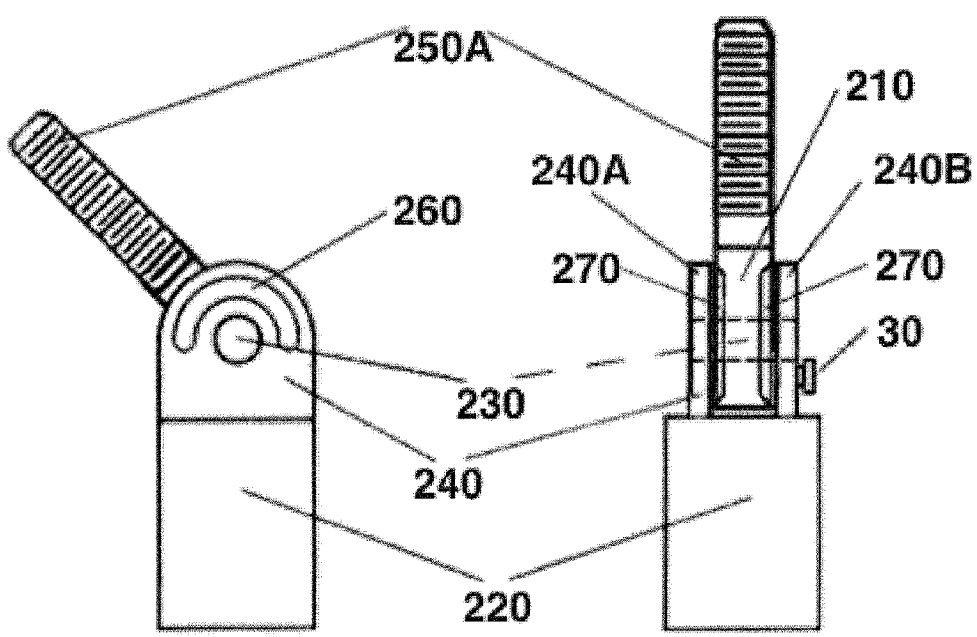
FIG. 8B depicts an elevation view of an alternative embodiment of a link using a disc shaped body.
FIG. 8C depicts a 90-degree elevation view of FIG. 8B.

The freedom of movement provided in the individual links need not be enabled only by a ball shaped body 110. In another embodiment, an example of which is illustrated in FIGS. 8A-C, at least one of the links is a disc link 200 composed of a disc shaped body 210. The circular shape of the disc shaped body 202 is convenient, but any substantially flat article that may be rotatably adjusted in relation to an adjacent substantially flat article is within the scope of the disclosure. The disc shaped body 210 is a substantially planar body coupled to a similar planar portion 240 of a housing 220.

A pivot 230 couples the disc shaped body 210 to the planar portion 240 of the housing 220 while allowing rotation of the disc shaped body 210.

A projection 250A extends from the disc shaped body 210 and may be threaded.

As shown in FIG. 8C, the housing 220 may have a plurality of planar portions 240A, 240B. At least one disc shaped body 210 may be coupled to a portion as described above, or may be fitted between two adjacent planar portions 240A, 240B. The disc shaped body 210 and the planar portion 240 are composed of compatible weldable materials allowing the disc shaped body 210 to be fused to the planar portion 240 of the housing 220. The disc shaped body 210 may contain beveled edges 270 to create open welding areas 280 allowing the fusing of the link into a solid structure. Planar portion 240 may also contain one or more apertures 260 allowing welding availability to the disc shaped body 210.

The position of the disc shaped body 210 relative to the housing 220 may be at lest temporarily secured by, for example, a set bolt 30. This feature of the disclosure is particularly useful if it is necessary to remove the link to a different location before the link may be more permanently fixed in position by welding or other appropriate method. Movement of the disc shaped body 210 allows rotational alignment between two or more links to create an appropriate in situ positioning of the connector. The disc shaped body 210 may be fitted against the planar portion 240 such that some resistance is provided to rotating the disc shaped body 210. The link will thus substantially remain in a given position until it is intentionally moved to a different position.

Figure 8D:
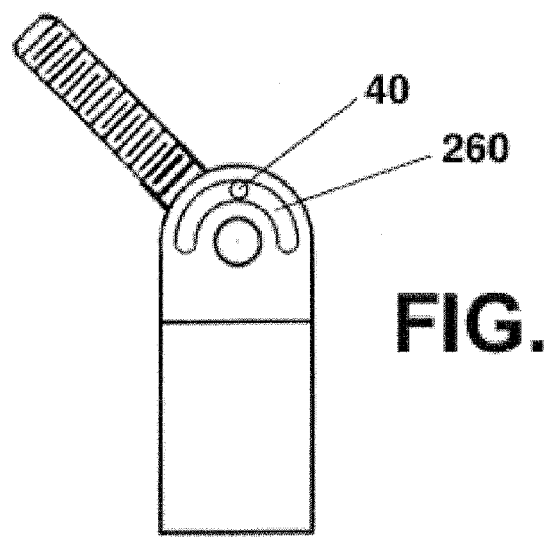
FIGS. 8D-E depict elevation views of alternative embodiments of a link using a disc shaped body.
Figure 8E:
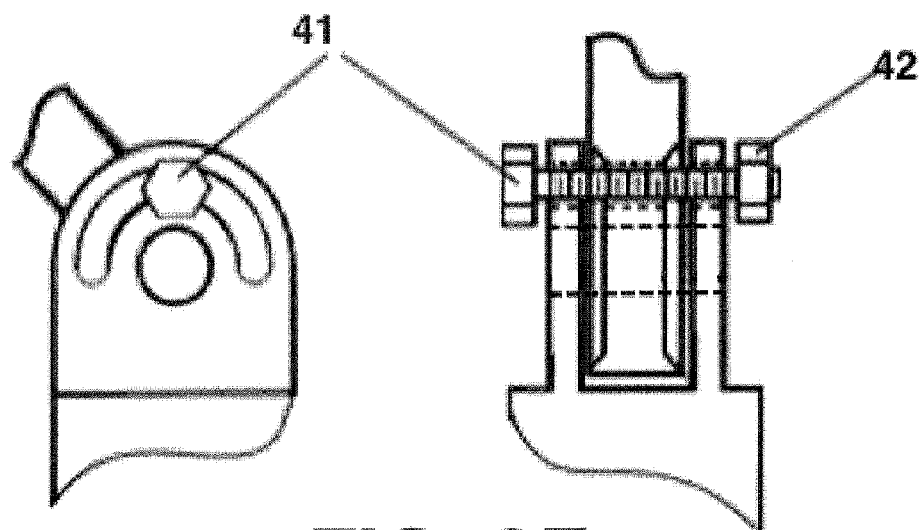

FIG. 8D-E shows a disc shaped body with a securing bolt hole 40 available in a rotatably-accommodating aperture 260 such that a securing bolt 41 and nut 42 are able to lock the disc shaped body-to one or more planar portion of the housing.

Figure 8F:
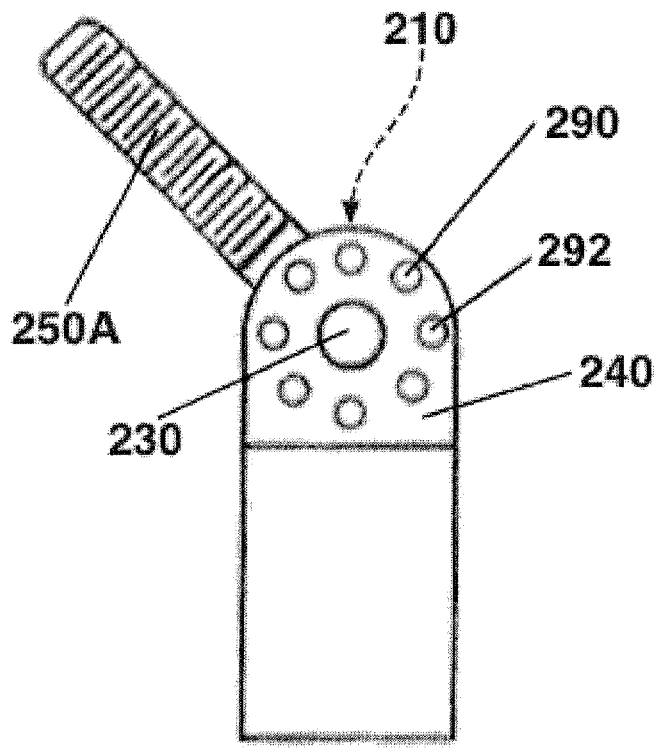
FIG. 8F depicts an elevation view of an alternative indexed embodiment of a link using a disc shaped body.

In a particular embodiment illustrated in FIG. 8F the rotation of the disc shaped body 210 is partially constrained to particular quantized degrees. In this embodiment, the disc shaped body 210 has a series of evenly spaced circular nubs 290. Circular nubs 290 are adapted to fit in corresponding recesses 295 in the planar portion 240 of the housing 220. Pivot 230 may be adjustable to be slightly longer than the thickness of the combined planar portion 240 and disc shaped body 210. The user may exert a force perpendicular to the plane of the disc shaped body 210 and planar portion 240, pulling the nubs 290 out of their corresponding recesses 295. The projection 250 of disc shaped body 210 may then be rotated to a desired position, preferably a position in which the nubs 290 again are fitted into recesses 295, and the user brings the disc shaped body 210 back to substantially flush with the planar portion 240. The disc shaped body 210 may be biased toward the planar portion 240 by, for example, a spring (not shown). Such a system would feature an appropriate method of allowing the adjustable loosening and securing of the mating features.

Figure 8G:
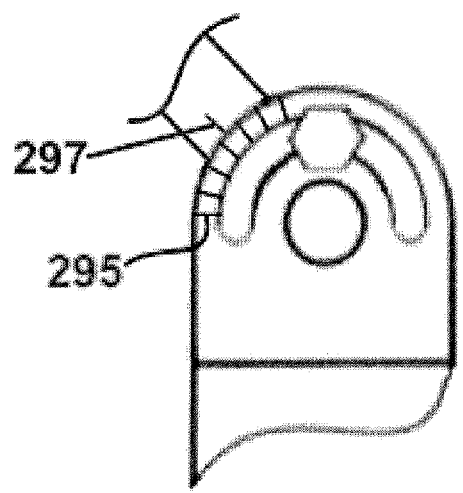
FIG. 8G depicts an elevation view of an alternative indexed embodiment of a link using a disc shaped body.

In FIG. 8G marking indicia 295 and 297 are illustrated on a disc shaped body link, for providing angle measurements.

Figure 9:
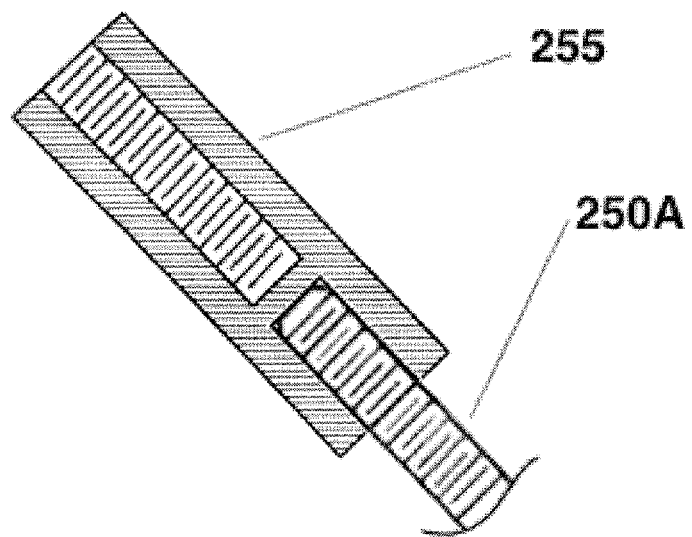
FIG. 9 is a section view of a thread threaded socket coupler adaptor affixed to a threaded coupler.

FIG. 9 is a section view of a threaded socket coupler adaptor 255 attached to threaded coupler 250A.

Alternatives to the disclosed structure will be readily apparent to one having skill in the art.

The invention is not limited to the disclosed links, or couplers, but may include alternative linking structures or couplers. For example, the link may be a housing having an axis with two opposing ends with a socket or "female" connection on both ends.

An alternative disc structure is illustrated in FIGS. 10A-B. In this embodiment, the link is a rotating bolts link 300 composed of at least two disc shaped bodies 210A, 210B. A pivot 230, couples the disc shaped bodies 210 to each other. Relative movement of the disc shaped bodies 210 allows rotational alignment between two or more couplers to create an appropriate in situ positioning of the link. The disc shaped bodies 210A, 210B have beveled edges 270 to create open welding area 280.

Also provided in one of the disc shaped bodies 210A is drill guide hole 50. An alternate way to secure a desired rotational configuration of the link's extensions 250A uses drill guide hole 50 to enable drilling a continuing hole through the other disc shaped body 210B, creating a new ability to install an appropriate bolt and nut so as to securely tighten both bodies 210A and 210B together in their final desired configuration.

FIG. 11A presents ball shaped bodies 110 having a both a threaded coupler 130A and a rod coupler 130B.

The rod coupler fits into a tubular sleeve coupler 85 of FIG. 11B-C.

FIG. 11B is an elevation view of a sleeve coupler 85 showing apertures 140 allowing welding of fitted coupling rods solidly to the sleeve coupler.

Lock bolts 40 are provided to secure the positions of said rod elements before welding.

FIG. 11C is a 90-degree section view of FIG. 11B.

Figure 11D:
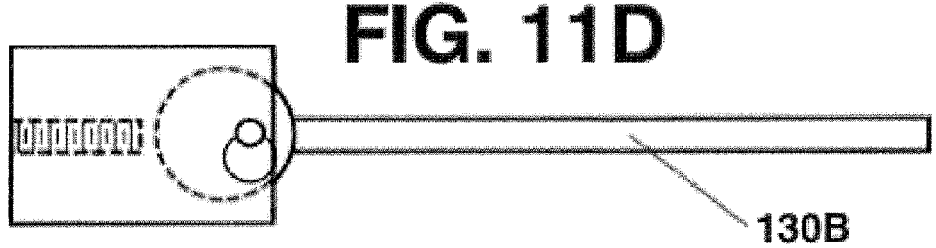
FIG. 11D presents a threaded link with an extended rod ball-coupler.
Figure 11E:
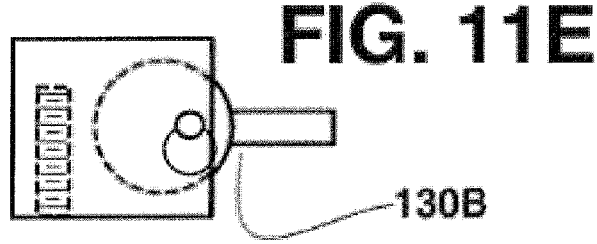
FIG. 11E presents a 90-degree threaded link with a short rod ball-coupler.
Figure 11F:
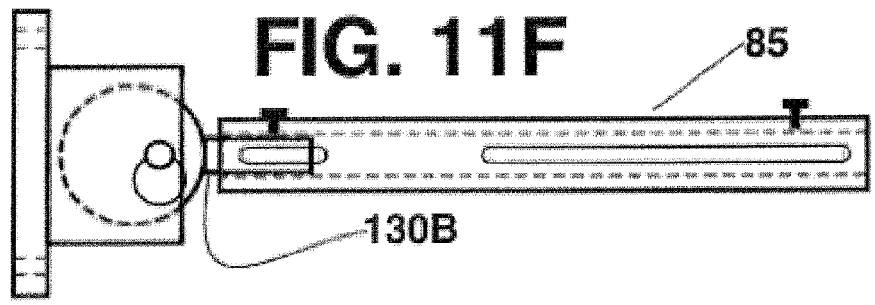
FIG. 11F presents a surface-mounting link with a short rod ball-coupler attached to a sleeve coupler.

FIGS. 11D-F illustrate three configurations of links featuring ball shaped bodies with rod coupling elements. FIG. 11D illustrates one embodiment of a weldable-ball link with an extended rod coupler 130B. FIG. 11E illustrates another weldable-ball link embodiment with a short rod coupler 130B. FIG. 11F illustrates a weldable-ball link embodiment with a short rod coupler fitted to a tubular sleeve coupler 85.

Figure 11G:
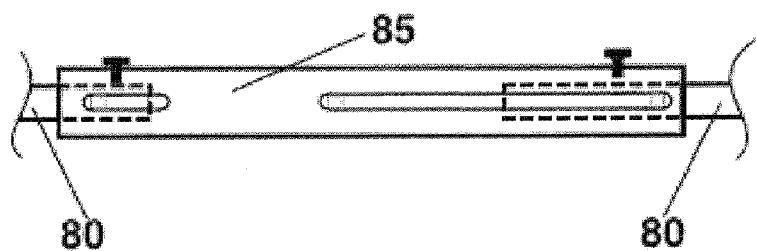
FIG. 11G is a tubular sleeve coupler fitted to independent rods.

FIG. 11G illustrates a tubular sleeve coupler of the present disclosure fitted to independent rods 80.

Figure 11H:
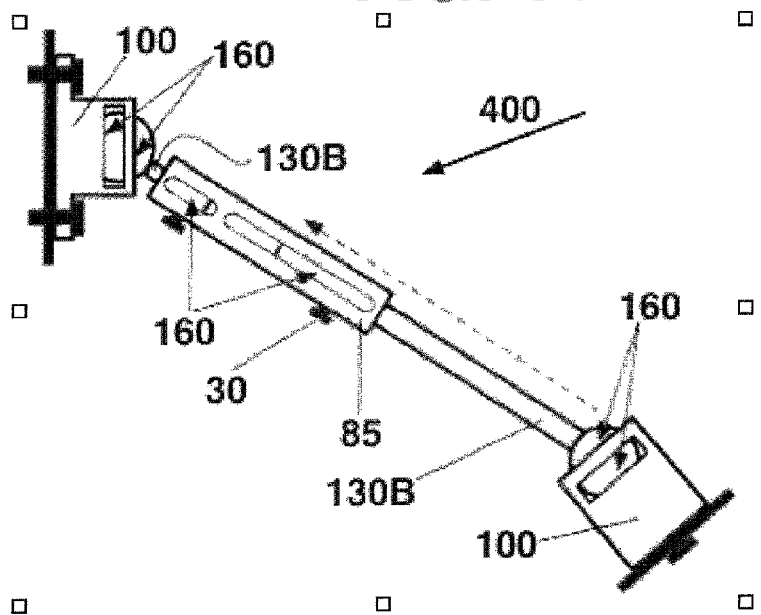
FIG. 11H illustrates a rod and sleeve link assembly.

FIG. 11H illustrates the creation of a structural self-aligning tie or strut connective assembly utilizing a sleeve and weldable-ball rod links of this disclosure.

Figure 11J:
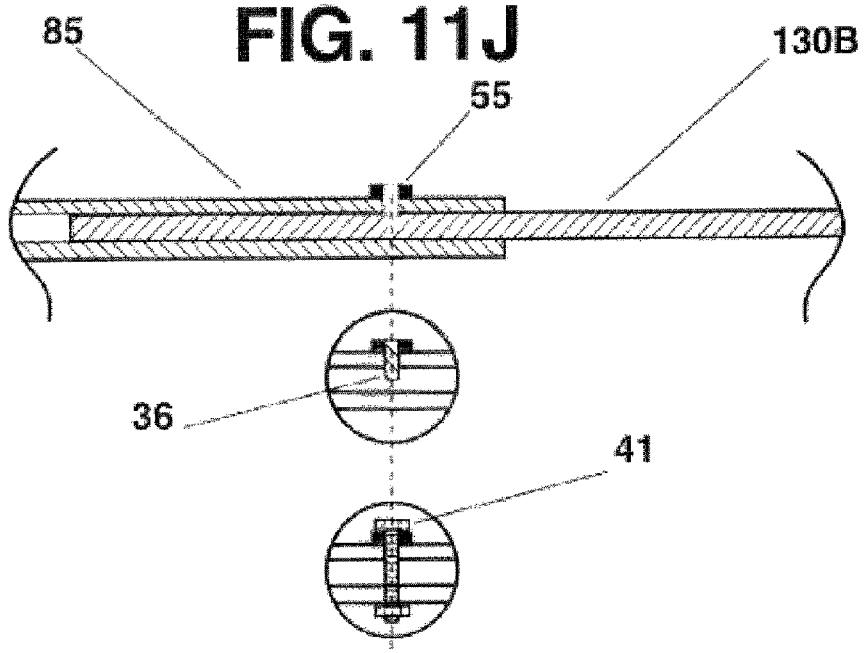
FIG. 11J is a section view of a rod and sleeve secured in position by other than welding.

FIG. 11J is a partial section view of a rod and sleeve assembly wherein the sleeve features a drill guide 55. The position of rod coupler 130B within sleeve 80 is secured by using the drill guide to drill a hole in the rod. The securing possibilities can be drilling the hole sufficiently deep to accept a locking pin 36 through the drill guild into the rod, or a hole can be drilled entirely through the rod and sleeve to allow bolting the two elements in place with a securing bolt 41.

FIG. 12A and FIG. 12B specifically illustrate tie assemblies used to solve one challenging aspect of converting an existing internal combustion engine driven vehicle into an entirely electric vehicle: installing a battery holder into the vehicles's body space that had been designed to contain the vehicle's fuel tank.

A surface-mounting weldable-ball link 100 of FIG. 2 is compressively bolted through the vehicle's body sheet metal 10A to a mounting plate above the sheet metal, affecting a solid structural attachment to the body.

Below, a weldable-ball link 100 of FIG. 1 is bolted to the battery holder 10B.

In FIG. 12A a turnbuckle tie assembly created with links 100 featuring balls having threaded couplers 130A and turnbuckle rod 70. The link housings are oppositely-threaded to turnbuckle rod 70, creating the functionality of being able to adjust the length of the tie by rotating rod 70. The length of the tie can further be adjusted by the depth of each link's threading into rod 70.

FIG. 12B is a self-aligning assembly featuring link balls having rod couplers 130B fitting to a tubular sleeve coupler 80.

Also indicated in both FIGS. 12A and 12B are the available welding locations 160 to fuse the structures solidly together.

A great advantage of the weldable-ball link 100 is that in creating this structural support of the battery holding frame, no precision is required in installing the body tie mount appliances to the variously shaped body sheet metal. The rotational self-aligning of the ball couplers of the two links will accommodate a wide range of installational variabilities.

Figure 13A:
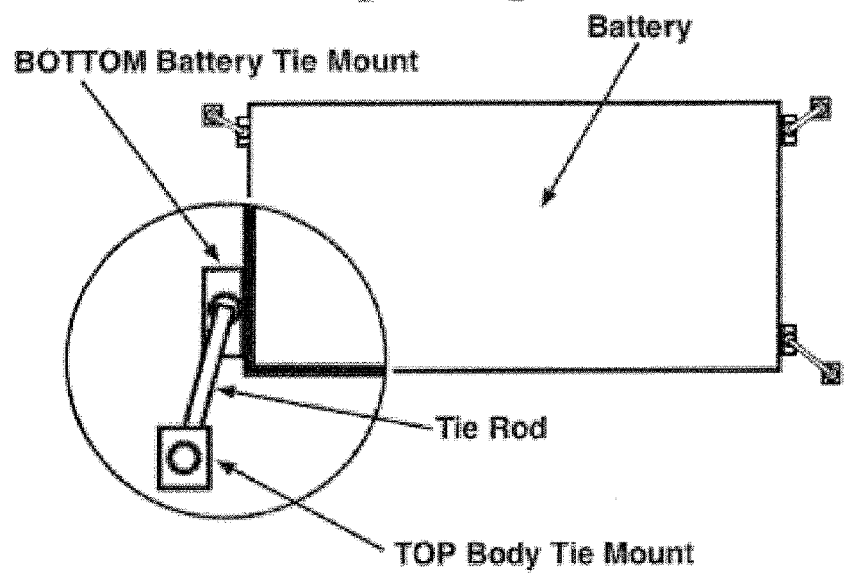
FIG. 13A is a plan view of a battery holder being supported under a vehicle by ties featuring links of the present invention.

FIG. 13A is a plan illustration of the use of four weldable-ball rod inks and rod-and-sleeve tie rod assemblies to secure a battery into a vehicle's former fuel tank body space.

Figure 13B:
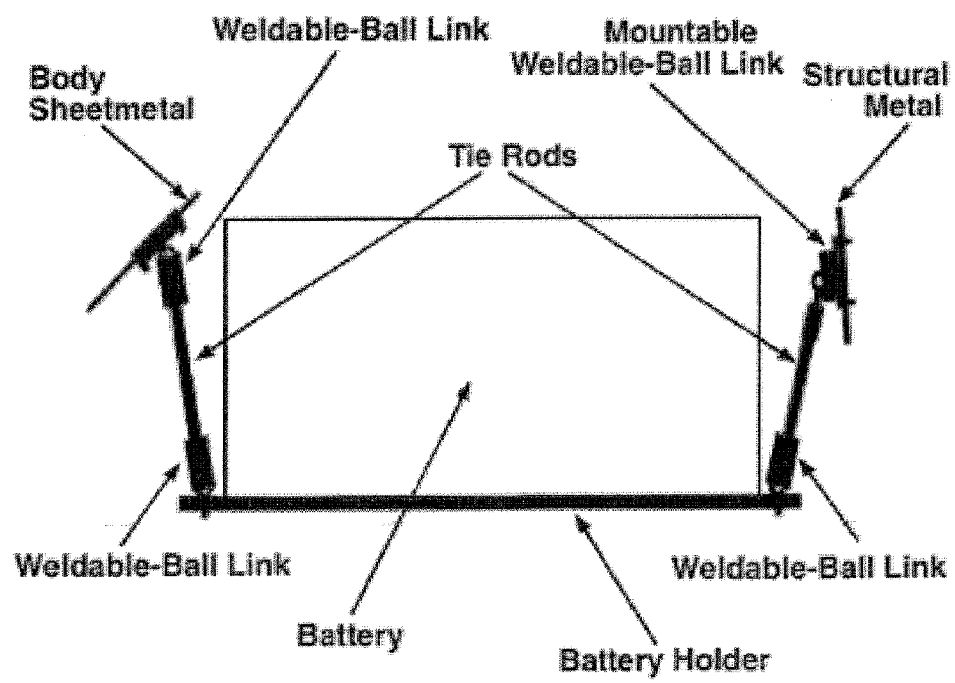
FIG. 13B is an elevation view of a battery holder being supported under a vehicle by ties featuring links of the present invention.

Illustrated in FIG. 13B is an elevation view of the battery installation scheme of FIG. 13A. Illustrated are two different types of body tie mounts to two different types vehicle attachment availabilities.

On the left side of the schematic is a body tie mount utilizing a weldable-ball link of FIG. 1 to body sheet metal.

On the right side of the schematic is a body tie mount utilizing a weldable-ball link of FIG. 2 to structural metal.

The angles relative to the battery of the ties is exaggerated to indicate the range of variability accommodated by the rotational adaptability of the links of this disclosure.

Such a battery installation utilizes four ties of varying lengths and angular configurations coupling to body tie mounts affixed to appropriate suspension points on the vehicle's body. The self-adjusting functionality of the weldable-ball rod-and-sleeve links allow an in situ solution to the uniqueness of each tie assembly's requirements.

Once a conversion technician has successfully created the four body tie mounts for the top of the body space, he supports the battery holder in its desired position. The top links of the body tie rod assemblies are affixed to the new body tie mounts or existing frame members of the vehicle, and the self-aligning functionalities of tie rod assemblies allows him to freely affix the lower links into the battery holder.

The resulting affixed structures are then welded together in situ as solid structural elements. Alternatively, the tie rod assemblies could be removed from the vehicle after the they are adjusted and secured in the proper length and angles, and the welded together in a different location.

Links and sliding-adjustable linking rods are used to create lateral securing support structures from the battery holder to the car structure as needed.

The installed battery holder is then ready to receive a battery.

Figure 14:
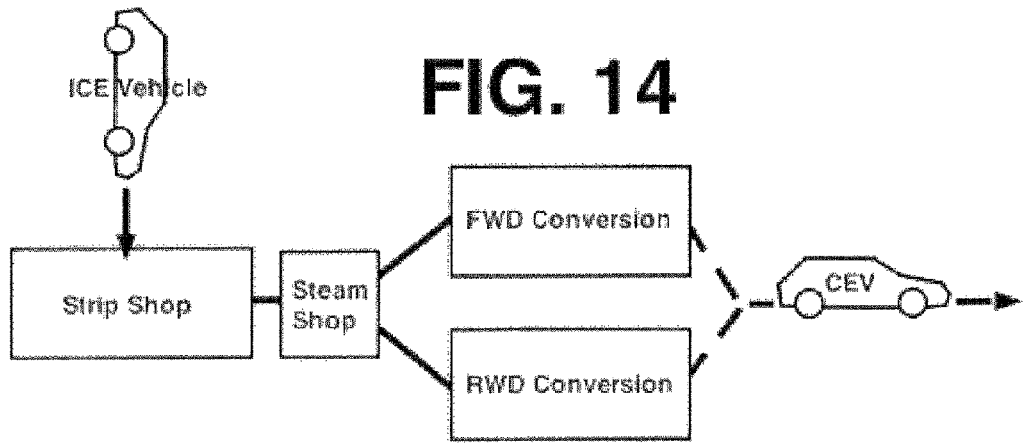
FIG. 14 is a schematic of a method of converting existing internal combustion engine vehicles to electric vehicles.

FIG. 14 schematically illustrates a scheme for the conversion of a conventional internal combustion engine driven vehicle to an electric motor driven vehicle.

An internal-combustion engine driven vehicle to be converted arrives at a strip shop. Here all existing components related to the existing internal combustion engine are removed: the engine; the radiator; the exhaust system; the engine-driven accessory pumps; the transmission; and the gas tank. The A/C pump and all other A/C components are retained and stowed in out-of-the-way positions. The removed components are now recycled as scrap metal.

The stripped vehicle then is pushed to a steam shop where the petroleum greasy vehicle under carriage is steamed cleaned. A feature and advantage of the present disclosure is that petroleum-powered vehicles are inherently oily and greasy—but from now on, the converted vehicle will be electric-motor clean.

The vehicle is then pushed to the conversion shop.

The conversion process is accomplished on specialized electric vehicle conversion racks. A stripped vehicle is raised onto the rack—and in less than one day will drive off as a newly converted electric vehicle.

The conversion process is different for FWD (Front Wheel Drive) and RWD (Rear Wheel Drive) vehicles.

FWD vehicles have all their drive components entirely in the engine compartment. So after removal of the engine/transmission drive components from the engine compartment, an electric conversion power module is simply dropped into the engine compartment, and bolted to the vehicle's existing motor mounts by vehicle-platform-specific mounting adaptors. The power module has adaptive means allowing installation to the vehicle's existing driving half axles. The power module also includes a battery.

For RWD vehicles, the drive train extends into and under the passenger compartment as a transmission and driveshaft. So instead of a single drop-in power module, a conversion sub-frame is installed onto the vehicle's existing motor- and transmission-mounts. The motor and battery pack and electronic control and support components are mounted as separate modules onto this sub-frame.

But for both types of vehicles, the problem of fitting a rear battery module into the multiplicity of vehicle sheet-metal body spaces designed to contain gas tanks—not batteries—is the same. As previously shown is in FIGS. 12A-B and 13A-B, the self-aligning functionalities of the weldable-ball links provide the necessary structural connecting abilities from disparate body mounting points to battery frame mounting points to create vehicle-specific battery installation structures in any vehicle being converted to fully electric drive.

Figure 15:
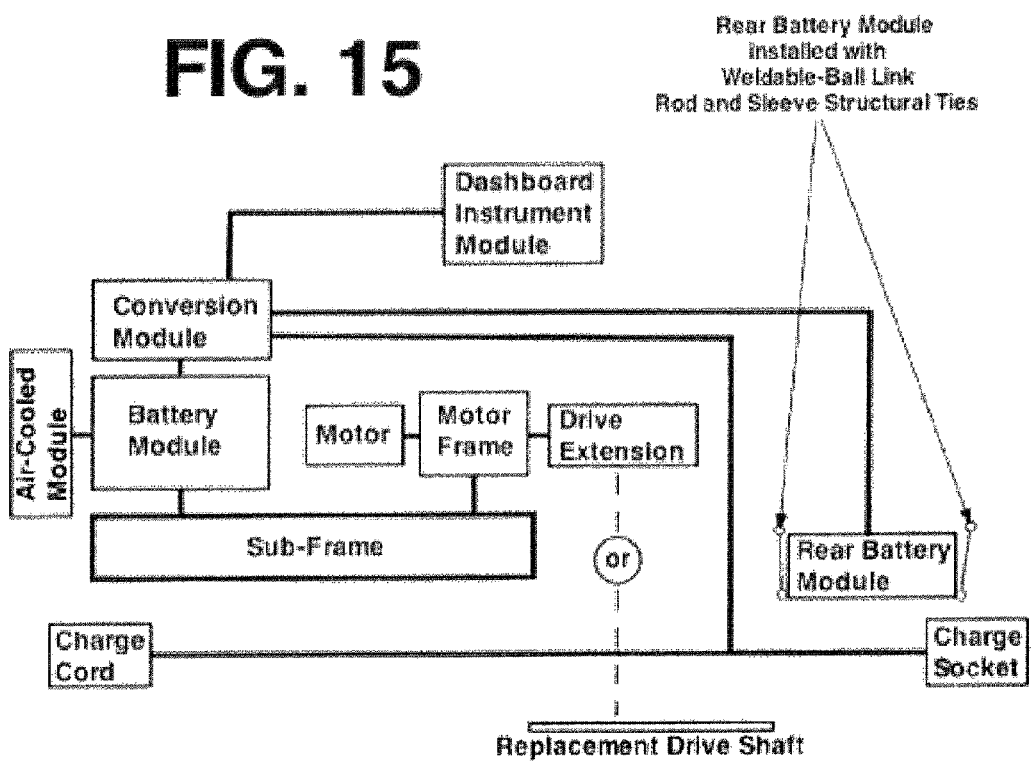
FIG. 15 is a schematic of the method for converting an internal combustion rear wheel drive vehicle into an electric vehicle.

Referring to FIG. 15, a schematic illustrates the modularity of the conversion process for a rear wheel drive vehicle is illustrated.

In such, a standardized conversion a sub-frame is installed in the former engine-compartment, adaptively bolting to the car's existing motor- and transmission-mounts. Referring again to FIG. 14, in such conversion, the existing internal combustion engine, transmission and fuel tank are removed. Then, onto this sub-frame a new electric motor is installed to a longitudinally-adjustable motor frame. If the existing drive shaft is to be used, an adaptive motor extension is also installed onto the motor frame—providing the adaptive connection to the existing drive shaft. Of course, the motor extension would not be needed if a new drive shaft is used.

The advantage of this scheme is that the motor replaces not only the former engine—but the former transmission. Such an installation frees the entirety of the former engine compartment to receive a battery module. The battery module would simply drop into a receiving structure of the sub-frame.

On top of the battery module is installed a conversion module. This conversion module contains the various electronic support systems and also contains replacements for the formerly engine-belt-driven accessories that are now electrically powered units, i.e.; power-steering pump, power-brakes vacuum pump, and an electric motor to power the vehicle's existing A/C pump. The module also contains the components of the vehicle's new electrically-heated/passenger cabin heating system.

An air-cooled module replaces the former radiator and houses heat-generating electronic components most needful of cooling. The former radiator required the engine-driven fan; this new module has its own electric-powered fan.

Also shown is a new dashboard instrument module that installs on top of the vehicle's existing dashboard and supplies information and controls for the new electric drive system.

FIGS. 16 A-D are a schematic of the functionalities of an electric vehicle conversion sub-frame for RWD vehicles being converted to electric vehicles.

FIG. 16 A is a plan view of a two-part RWD electric vehicle conversion sub-frame assembly.

The assembly contains sub-frame 301 onto which is mounted sliding-adjustable rear extension 302. Front mounting rail 305A is sliding-adjustably installed onto sub-frame 301; rear mounting rail 305B is sliding-adjustably installed onto extension 302. The mounting rails are longitudinally adjustable so as to be located over the vehicles existing motor and transmission mounts. These rails also contain laterally-sliding-adjustable mounts that have vehicle-specific mounting-adaptors attached. The mounts can be adjusted in width to allow the mounting-adaptors to be bolted to the existing vehicle mounts.

The conversion sub-frame installation process begins with the sub-frame 301 and the rear extension 302 having their respective mounting rails 305A and 305B and their adjustable mounts welded to their specified vehicle-platform-specific positions. To the now solid-mounting-rails and mounts, vehicle-platform-specific mounting adaptors 307 are bolted. The rear extension 302 is so assembled to sub-frame 301 such that rear extension 302 is sliding-adjustable within the resulting sub-frame assembly. The sliding-adjustable sub-frame assembly is then brought up under the vehicle and its mounting adaptors 307 are bolted to the existing motor mounts and then, by sliding rear extension 302 into position, the rear extension 302 is bolted onto the vehicle's existing transmission mounts with the rear extension's mounting adaptors 307. The installation of the sub-frame assembly being achieved, the sub-frame rear extension 302 is finally welded solidly to sub-frame 301.

FIG. 16 B is a front elevation of FIG. 16 A. Shown are two laterally-sliding adjustable mounts of the sliding-adjustable mounting rail 305A. These are positioned laterally as required to be adjacent to the vehicle's existing motor mounts.

FIG. 16 C is a rear elevation of FIG. 16 A. Shown is the motor 304 installed to motor frame 303 that is sliding-adjustably installed on rear extension 302. For illustrative clarity, rear mounting rail 305B is shown separately, below its attachment to rear extension 302. Rear mounting rail 305B is shown installed to the vehicle's existing transmission mounts that are part of supporting cross member 306 by vehicle-specific mounting adaptors 307.

It is a featured advantage of this electric vehicle conversion scheme that the new electric drive motor is located to replace not the former engine but the former transmission.

FIG. 16D is a side elevation view that illustrates motor frame 303 installed sliding-adjustably to rear extension 302. Motor 304 is mounted to motor frame 303 and so it becomes installed into the vehicle body cavity that had formerly contained the vehicle's transmission.

It should be understood that many changes, modifications, variations and other uses and applications may be made after considering the specification and the accompanying drawings. For example, U.S. Pat. No. 5,495,677, incorporated herein by reference discloses an extremely accurate displacement gauges using threaded bodies. Additionally, several laser based methods are known to measure distances and angles between components and translate the acquired data to a computer aided drafting (CAD) software format. See, e.g., U.S. Pub. No. 2004/0122628 which is also incorporated herein by reference. The links described in this disclosure may provide distance and angular gauges to determine the length and angular relationships or other spatial relationships between coupled links. Instead of welding the links together, then, the spatial information may be used to provide a CAD rendering of a three dimensional custom object that is conveniently manufactured by a three dimensional printer or other hardware manufacturing mechanism. In addition, carpenters and hobbyist woodworkers are more and more frequently discarding rulers and using other methods to measure relative dimensions to ensure more secure fits between interlocking components. The system and method described above may be usefully adapted to provide a simple method or tool to measure and reproduce specific dimensions, angles, and other spacial relationships by putting suitable marking indicia 295, 297 on the components to permit measurement of lengths and angles as illustrated in FIG. 8G. Also, if desired, the links disclosed in this application may be used for modeling a connector to connect two surfaces in an irregular space, by providing a connector having at least one adjustable spatial feature, and a gauge for measuring the at least one adjustable spatial feature; adjusting the at least one adjustable spatial feature to connect the two surfaces; and recording measurements of the at least one adjustable spatial feature from the gauge. In one embodiment, the measurements of the gauge may be transmitted by wired or wireless transmission to a memory. And, if desired, the measurements of the gauge may be converted to a computer aided drafting format to create a three dimensional model of a solid structure for connecting the two surfaces, wherein the solid structure has measurements substantially similar to measurements of the gauge. Any and all such changes, modifications, variations and other uses and applications which do not depart from the spirit and scope of the invention are deemed to be covered by the invention.

DRAWINGS

Reference Numerals

10/10A/10B surface
20 double-end bolt
30 set bolt
35 locking pull-pin
40 bolt hole
41 securing bolt
42 securing nut
50 drill-guide hole
60 attaching element
70 turnbuckle rod
80 rod
85 sleeve coupler
90 threaded coupling element
100 weldable-ball link
110/110A/110B ball shaped body
120 housing
130A threaded coupler
130B rod coupler
135 threated socket coupler
140 aperature
150 ball retainer
160 welding area
170 mounting hole
200 rotating disc link
210/210A/210B disc shaped body
220 housing
230 pivot
240/2407A/240B planar portion
250A threaded coupler
250B rod coupler
255 threated socket coupler adaptor
260 aperture
270 beveled edge
280 welding area
290 nub
292 recess
295 marking indicia
297 indicia pointer
300 rotating bolts link
301 sub-frame
302 rear extension
303 motor frame
304 motor
305A front mounting rail
305B rear mounting rail
306 cross member
307 mounting adaptors
400 ball and rod universal connector

The invention claimed is:

1. A method for connecting two surfaces in a non-uniform space, the method comprising:
providing a connector having a first link having a housing and at least one adjustable spatial feature, wherein the adjustable spatial feature includes a threaded socket or threaded projection, wherein the housing has at least one aperture adapted to allow a welding torch or welding electrode access to the adjustable spatial feature of the housing, and wherein the housing has a first end and a second end, and contains a first ball shaped body in the first end and a second ball shaped body in the second end;
coupling the first link with a second link or a hardware component and adjusting the adjustable spatial feature of the first link by rotating the first link relative to the second link to adjust a length of the connector to custom fit the two surfaces to be connected; and
fixing the adjustable spatial feature(s) of the links by welding so that the links become a substantially permanent solid fixed structure.

2. The method of claim 1, wherein the at least one adjustable spatial feature is selected from a group consisting of a length of the link, a circumference of the link, and an angle between a first portion and a second portion of the link.

3. The method of claim 1, wherein the second link also includes at least one adjustable spatial feature.

4. The method of claim 1, wherein the first and/or second link comprises a ball shaped body that is rotatable in the housing.

5. The method of claim 4, wherein the ball shaped body has a threaded projection or a threaded socket.

6. The method of claim 4, wherein the housing includes a retainer for retaining the ball shaped body in the housing prior to welding.

7. The method of claim 1, wherein the housing further comprises a threaded socket.

8. The method of claim 1, wherein the housing has an axis and a first end and a second end, and wherein a ball shaped body is arranged on the first end of the housing and a threaded socket is arranged on the second end of the housing and extends along the axis of the housing.

9. The method of claim 1, wherein the housing has an axis and a first end and a second end, and wherein a ball shaped body is arranged on the first end of the housing and a threaded socket is arranged proximal to the second end of the housing and extends substantially perpendicular to the axis of the housing.

10. The method of claim 1, wherein the first and/or second link comprises a disc shaped body that is rotatable relative to the housing.

11. The method of claim 10, wherein the disc shaped body and the housing have substantially the same melting point at least in part, and including the step of heating the disc shaped body and the housing to fuse the disc shaped body and the housing to one another.

12. The method of claim 10, wherein the housing has a plurality of equally spaced recesses and the disc shaped body has a corresponding plurality of equally spaced nubs.

13. The method of claim 1, wherein the first and/or second link and/or the housing have indicia symbolizing a distance or an angle.

14. A connector system for connecting two surfaces in a non-uniform space, the system comprising:
at least one first link having a housing and at least one adjustable spatial feature, wherein the at least one adjustable spatial feature comprises a threaded projection, wherein the housing has at least one aperture for allowing a welding torch or welding electrode access to the adjustable spatial feature of the housing and wherein the housing has a first end and a second end, and contains a first ball shaped body in the first end and a second ball shaped body in the second end; and
at least one second link or a hardware component coupled to the first link such that the adjustable spatial features of the first and/or second links custom fit the two surfaces to be connected; and means for fixing the adjustable spatial features of the links by welding such that the links becomes a substantially permanent solid fixed structure.

15. The system of claim 14, wherein the at least one adjustable spatial feature is selected from a group consisting of a length of the link, a circumference of the link, and an angle between a first portion and a second portion of the link.

16. The system of claim 14, wherein a threaded socket is arranged in the housing of the second link.

17. The system of claim 14, wherein the first link is rotatable relative to the second link to adjust a length of the connector.

18. The system of claim 14, wherein at least one link comprises a ball-shaped body that is rotatable in the housing.

19. The system of claim 18, further including a pull-pin for locking the ball in position.

20. The system of claim 14, wherein the ball shaped body has a threaded projection or a threaded socket.

21. The system of claim 14, wherein the housing further comprises a threaded socket.

22. The system of claim 14, wherein the housing has an axis and a first end and a second end, and wherein a ball shaped body is on the first end of the housing and a threaded socket is on the second end of the housing and extends along the axis of the housing.

23. The system of claim 14, wherein the housing has an axis and a first end and a second end, and wherein a ball shaped body is on the first end of the housing and a threaded socket is proximal to the second end of the housing and extends substantially perpendicular to an axis of the housing.

24. The system of claim 14, wherein the first link is slidable relative to the second link to adjust a length of the connector.

25. The system of claim 14, wherein the link comprises a disc shaped body that is rotatable relative to the housing.

26. The system of claim 25, wherein the disc shaped body has a melting point and contacts a portion of the housing that has substantially the same melting point as the disc shaped body.

27. The system of claim 25, wherein the housing has a plurality of equally spaced recesses and the disc shaped body has a corresponding plurality of equally spaced nubs.

28. The system of claim 25, wherein the housing and/or links have indicia symbolizing an angle or a distance.

29. The system of claim 14, wherein the link and/or the housing has indicia symbolizing a distance or angle.

30. The system of claim 14, wherein the housing includes a retainer for retaining the ball shaped body in the housing prior to welding.

* * * * *